March 18, 1947.   W. SCHAELCHLIN ET AL   2,417,784
POSITION REGULATION SYSTEM
Filed March 25, 1944   2 Sheets-Sheet 1

WITNESSES:
INVENTORS
Walter Schaelchlin and
Erling Frisch.
BY
Paul E. Friedemann
ATTORNEY March 18, 1947.                W. SCHAELCHLIN ET AL                2,417,784
                              POSITION REGULATION SYSTEM
                    Filed March 25, 1944                 2 Sheets-Sheet 2

Patented Mar. 18, 1947

2,417,784

UNITED STATES PATENT OFFICE 2,417,784

POSITION REGULATION SYSTEM

Walter Schaelchlin, Wilkinsburg, and Erling Frisch, Pittsburgh, Pa., assignors to Westinghouse Electric Corporation, East Pittsburgh, Pa., a corporation of Pennsylvania Application March 25, 1944, Serial No. 528,138

10 Claims. (Cl. 172—282)

This invention relates to position regulation systems and particularly to such systems which include a normally balanced electrical system which by movement of a control member is electrically unbalanced in an amount and in a direction which is indicative of the movement or position of the control member and which also includes means sensitive to such electrical unbalance for positioning an element and restoring the system to a condition of electrical balance. While this invention as hereinafter described is specifically applied to a steering control for a ship, it is of general application and may be used to position any follow-up element requiring either angular or rectilinear positioning movement.

In this connection it will be apparent that the principles of this invention may be embodied by way of example in systems for positioning turrets on tanks, naval vessels or aircraft, for positioning in traverse or elevation, large guns such as those used for coast defense and for positioning various other devices where weight makes manual operation impractical, and where speed and accuracy of positioning movement are required.

A principal object of this invention is to provide a position regulating system which is mechanically and electrically simple.

Another object of this invention is to provide a system of the character referred to in which an electrical unbalance indicative of the extent and direction of movement of a piloting member is used to position a follow-up element.

Another object of this invention is to provide a follow-up control system including a piloting member and a follow-up element, which is electrically unbalanced by movements of the piloting member and restored to electrical balance upon movement of the follow-up element to its proper position.

Still another object of this invention is to provide a system of the character referred to in the preceding object in which a small electrical unbalance is utilized to produce a large electrical stimulus for positioning the follow-up element.

Still another object of this invention is to provide a system of the character referred to in which an electrical stimulus varying disproportionally with movements of the piloting member is used for positioning the follow-up element.

A further object of this invention is to provide a position regulating system in which an effective anti-hunting control of the electrical stimulus for positioning the element to be positioned is provided.

A still further object of the invention is to provide a position regulation system in which the positioning electrical stimulus is controlled in magnitude within a predetermined maximum value to prevent excessive overloading of the mechanical and electrical components of the system.

An ancillary object of the invention is to provide a system of the character referred to in which the element to be positioned is mechanically restrained from movement until the system is electrically unbalanced.

Other objects and advantages will become apparent upon a study of the following specification when considered in conjunction with the accompanying drawings; in which:

Fig. 5 is a schematic diagram illustrating a practical embodiment of the invention.

Normally in position regulation systems accurate follow-up by the controlled element of the movements of the control or pilot member is desired. However, in cases where large masses constitute the follow-up element or where external forces of large magnitude act on the follow-up element, to obtain accurate follow-up movement of relatively high values of acceleration of the piloting member, the electrical and mechanical components required in the driving system become prohibitively large. To overcome the possibility of overworking a follow-up system, slip clutches have in some instances been placed in the input drive to the system and the clutch so adjusted that accelerations beyond permitted values would cause the clutch to slip. Thus the input to the system could be maintained within some predetermined working range.

In the instant application the electrical components of the system are such that irrespective of excessive accelerations of the pilot member the electrical stimulus produced for operating the follow-up element may reach only a certain predetermined maximum value which is controlled by the operating characteristics of the rotating electrical equipment used in the control system. Thus for a predetermined character of loading of the follow-up element a system may be provided which is free of the possibility of either mechanical or electrical overload but which may still operate to produce accurate positioning of the follow-up element within limits of time permissible for satisfactory follow-up operation.

Figure 1:
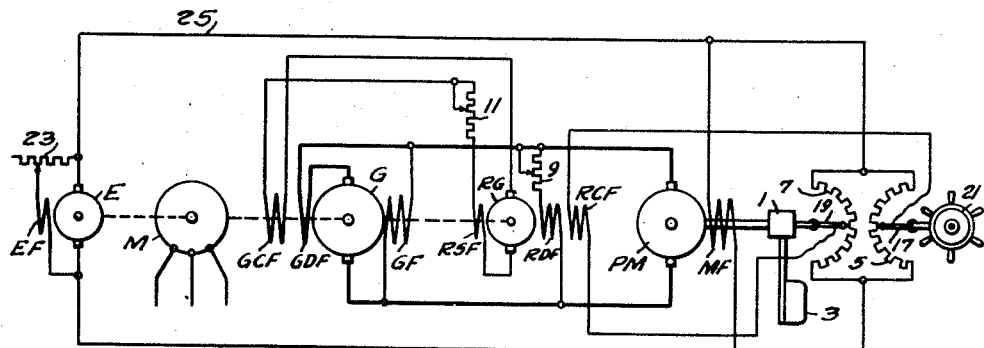
Figure 1 is a schematic diagram illustrating the fundamental principles of this invention.

The apparatus by means of which the foregoing functions are accomplished is illustrated in its most fundamental form in Fig. 1. The rotating equipment of the control system herein illustrated includes a positioning motor PM which operates through a gearing unit 1 to drive a rudder 3 employed in steering the ship. This positioning motor is supplied by the main generator G, the electrical output of which is controlled by the regulating generator RG, the electrical output of which in turn is controlled by the electrical unbalance of the circuit including the pilot house rheostat 5 and the steering room rheostat 7. Electrical energy for the entire system is supplied from a source of substantially constant potential indicated by the exciter E through the main busses 25 and 27. The main generator, the regulating generator and the exciter are driven by a motor M which may be any suitable constant speed source of mechanical power.

Before proceeding with a detailed description of the circuits of Fig. 1 it will be best to consider both the generator and the regulating generator separately so that an understanding of their field winding connections may be had.

The main generator G is provided with a control field winding GCF which is separately excited from the regulating generator RG. A shunt field winding GF is connected directly across the generator terminals. The third field winding GDF of the main generator is a differentially connected series field winding which opposes the action of the separately excited and shunt field windings. These three field windings are preferably designed to limit the maximum current which may flow in the motor circuit with the motor stalled. This is necessary to protect the motor and generator system under conditions of heavy load when for some reason or other movement of the rudder is hindered.

Figure 2:
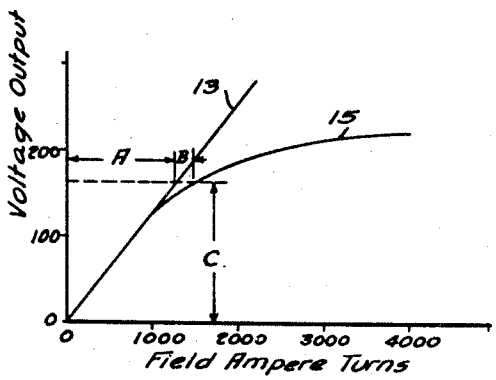
Fig. 2 is a curve illustrating the operating characteristics of the regulating generator which senses an electrical unbalance of the system.

The regulating generator comprises a field RSF which is connected in series with the regulating generator armature and consequently with the control field GCF of the main generator. An adjustable resistor 11 connected in series in this field winding circuit is provided so that the field current can be adjusted so that the field ampere turns, as a function of the regulating generator voltage, will coincide with the initial straight sloping portion of the regulating generator saturation curve. By properly adjusting the resistor 11 the field circuit may be controlled and the regulating generator thus made substantially self-energizing and a very small current in the control field winding RCF will cause the voltage to build up to a relatively high value. This is indicated in the regulating generator saturation curve of Fig. 2. In Fig. 2 the straight line 13 representing the aforenamed characteristic of the regulating generator obtained by properly adjusting the field circuit coincides with the initial straight portion of the saturation curve 15. The ampere turns represented by the self energizing properties of the machine are indicated in magnitude at A. The ampere turns of the machine obtained upon energization of the control field winding are indicated at B. The total ampere turns of the machine thus varies as some varying function of the current exciting the control field winding. By making the regulating generator substantially self energizing, it will be seen that for relatively small values of excitation of the control field winding a large voltage output C may be obtained and that this voltage output increases disproportionally with increase in values of excitation of the control field. Thus the voltage output of the machine is limited by the saturation curve 15 of the regulating generator and irrespective of the currents exciting the control field windings will not become dangerously large. The separately excited control field RCF is excited in a bridge circuit between the pilot house rheostat 5 and the steering room rheostat 7. Its terminals are connected directly to sweep arms 17 and 19, respectively operated by the pilot house steering wheel 21 and by the positioning motor PM through the medium of the gear box 1. A shunt field winding RDF is differentially connected with respect to the other two fields and is energized from the main generator terminals. This field may be termed an antihunting field since its purpose is to slow the speed of the rudder motor as the rudder approaches a position corresponding to the steering wheel position, thereby preventing overtravel and hunting of the motor. Due to the reaction of the antihunting field the ampere turns of the control field must be increased to obtain the same regulating generator voltage. However, the ampere turns of the antihunting field may be kept low and will thus not measurably effect the sensitivity or amplification of this generator. Means for varying the differential effect of this field particularly when the motor is decelerating is provided in the embodiment of Fig. 5, and will be hereinafter described.

The positioning motor PM is provided with a single field winding. This winding is energized from the exciter and hence has a constant exciting potential applied thereacross at all times. As a result the speed of the positioning motor depends entirely upon the output of the main generator G with which it is directly connected.

The exciter is provided with a single field winding EF although a series field winding for further voltage stability control may be included if so desired and the excitation of this single field winding EF may be controlled to give the desired exciter output by properly adjusting the resistor 23. All of the generating equipment is shown connected to a common shaft which is driven by the motor M. The bridge circuit including the rheostats 5 and 7 is supplied with electrical energy from the exciter.

Figure 3:
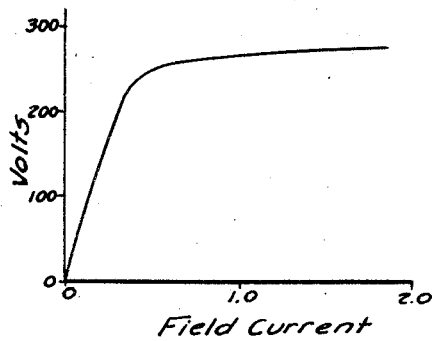
Fig. 3 is a curve illustrating the operating characteristics of the main generator of the system which produces the electrical stimulus or quantity utilized for energizing the positioning motor.

In Fig. 3 the field current of the regulating generator is plotted as the abscissa and the voltage output of the main generator as the ordinate. The output of the main generator depends upon the control effected by the regulating generator upon its control field winding GCF. It will be seen from the steepness of the curve of Fig. 3 that the output of the generator increases rapidly for relatively small increases in current in the regulating generator control field RCF.

Figure 4:
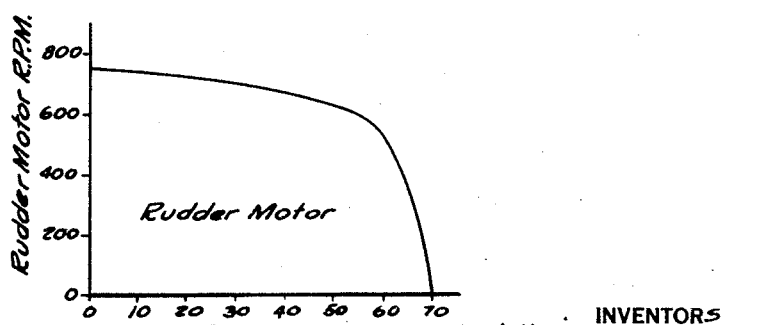
Fig. 4 is a curve of the operating characteristic of the positioning motor in the control system.

The curve of Fig. 4 shows the motor speed as a function of the rheostat travel or degrees of rudder movement while moving the rudder 70° from hard over to hard over. In this illustration the assumption is made that the motor torque remains constant at approximately 50% of the full load torque during the entire travel.

As illustrated in Fig. 1 the rheostat sweep arms 17 and 19 are located at like points on each of the rheostats 5 and 7. Hence the opposite sides of the regular control field winding RCF are at points of like potential and as a result no current will flow in this field winding. Assuming now that the steering wheel 21 is moved to displace the sweep arm 17 across a portion of the resistor 5, a potential difference between the sweep arms 17 and 19 occurs and hence a current is caused to flow through the regulator control field winding RCF in a direction which depends upon the direction of movement of the steering wheel 21. The electrical output of the regulating generator thus excites the control field winding GCF of the main generator G causing an electrical output of the main generator which energizes the positioning motor PM and affects rotation of this motor in such a direction as to move the sweep arm 19 in the same direction as that moved by the sweep arm 17 operated by the steering wheel, until the bridge circuit is again balanced, at which time current ceases to flow in the regulator control field RCF and the motor consequently comes to rest. Thus the rudder is positioned angularly as indicated by the movement of the steering wheel 21.

Considering now the foregoing operation in terms of the curves of Figs. 2 to 4, inclusive, it will be noted that for very slight displacements or unbalances of the bridge circuit a relatively large voltage as C is produced. Thus the positioning motor PM operates at substantially its maximum speed to effect a rapid fol'ow-up of the movements of the steering wheel by the rudder 3. Such follow-up movements of the rudder, however, tend to restore the bridge to a condition of electrical equilibrium and rapidly reduce the value of the ampere turns B added to the regulating generator by the current flow in the field RCF caused by the unbalance of the bridge. As the excitation of the field RCF is decreased the residual magnetism of the regulating generator in conjunction with the series field winding RSF tends to maintain a certain minimum voltage across the generator control field GCF tending to maintain the generator voltage and hence the voltage in the differential field RDF. In addition as the excitation of the control field RCF decreases the differential effect of the field winding RDF of the regulator generator becomes more predominant and tends to pull the voltage of the regulator generator down to rapidly reduce the excitation of the control field winding of the main generator. Thus the reactive effect of the differentially connected field RDF on the regulating generator RG causes the current supply to the field GCF of the main generator and, hence, the current supply to the motor to fall off at a rate which is greater than that indicated by the remaining electrical unbalance in the bridge circuit. In this manner the system in a sense anticipates a condition of equilibrium and by properly matching the electrical and mechanical components in the system it is possible to obtain operation which is free of hunting.

As previously mentioned the illustration of Fig. 4 graphically illustrates the operating characteristics of the motor while moving the rudder 70% from hard over to hard over. As a result the speed of the rudder motor is maximum when the rudder is at its zero position and zero at its limit of movement in a given direction. This curve illustrates the manner in which the speed of the rudder motor is reduced to zero as the follow-up rheostat approaches the point of balance in the bridge circuit. It will be seen that for a large portion of the rudder movement the motor speed lies within the range of 600 to 800 R. P. M. and thereafter drops rapidly to zero as equilibrium is approached. This condition holds true whether the curve had begun, for example, at zero degrees say for a right-hand rudder movement to its maximum position or for some other intermediate movement. The operation of the system is always such that the speed of the rudder motor as equilibrium is reached is rapidly brought to zero to prevent overtravel. The differentially connected series field GDF of the main generator tends to hold the current in the motor generator circuit within reasonable limits under abnormal operating conditions such as when the rudder is for some reason or another momentarily jammed. Overload protection is of course necessary if the period of rudder jamming is longer than, say, a few seconds in duration. Such a feature together with other desirable control features, purposely omitted from Fig. 1 for the purpose of more clearly setting forth the fundamental, are shown in Fig. 5.

The embodiment of the invention illustrated in Fig. 5 insofar as the motor and generator system is concerned is in principle the same as that of Fig. 1. The main differences reside in the addition of the various switching drums to provide follow-up and non-follow-up control of the rudder and to effect pilot room or steering room control of the rudder, the addition of suitable load sensitive devices for protecting the system against electrical overload and for restraining the rudder against movement; and the addition of limit switches in the control rheostat bridge circuit to prevent overtravel of the rudder beyond either of its left or right extremes of movement.

The switching drums reading from top to bottom of Fig. 5 are: the Pilot house control switch PC which provides non-follow-up control of the positioning motor PM from the pilot house in conjunction with the other drum switch setups to be hereinafter described; the Pilot house selector switch PS which has provisions for circuit settings for follow-up and non-follow-up control of the motor PM; the Steering room selector switch SS which provides control of the motor PM from the pilot house or the steering room; and the Steering room control switch SC which provides non-follow-up control of the motor PM from the steering room, this latter being primarily an emergency control.

The sequence of control and selector switch settings for the various control setups for operating the motor PM are:

1. *Pilot house follow-up control*

For this control of the motor PM the control switch PC is in its "off" position. The selector switch PS is set in its "follow-up" position. The selector switch SS is set in its "pilot room" position. The control switch SC is in its "off" position.

2. *Pilot house non-follow-up control*

For this control of the motor PM the control switch PC is operated through the "fast" or "slow" positions on either side of the "off" position or both for either left or right rudder movement. The pilot room selector switch PS is set in its "non-follow-up" position. The steering room selector switch SS is set in its "pilot room" position. The steering room control switch SC is in its "off" position.

3. *Steering room non-follow-up control*

For this control of the motor PM the control switch PC is in its "off" position. The pilot room selector switch PS is in its "non-follow-up" position. The steering room selector switch SS is in its "steering room" position. The steering room control switch SC is operated through its "fast" or "slow" positions or both on either side of the "off" position for left and right rudder movement.

Broadly stated the selector switches function in the follow-up position pilot room control to provide the circuit connections for the control field windings GCF and RCF as are illustrated in Fig. 1 and for non-follow-up control the selector switches function to provide the non-follow-up operation either pilot room or steering room control while the respective control switches PC and SC, whichever is rendered operative by the selector switch SS, is employed to provide left and right rudder movement. In the "non-follow-up" position of the selector switch PS the control field GCF of the main generator G is disconnected from the regulating generator RG and connected across the exciter E through whichever of the control switches PC or SC is operative. The control switches control the polarity of the field GCF as well as the degree of excitation for either fast or slow operation in either direction.

For pilot room follow-up control the bridge circuit, in which the conductors are shown crossed over and back merely for the purpose of disposing the limit switches in the proper legs of the bridge, is energized from the exciter E through a circuit beginning with positive exciter bus 25, contact SS4 of selector switch SS now in "pilot room" position, contact PS1 of selector switch PS now in "follow-up" position, conductor 29 to one side of the bridge circuit, from the opposite side of the bridge circuit through conductor 31, junction 33, contact SS6 to bus 27 of the opposite side of the exciter.

The main generator control field winding GCF is energized from a circuit which may be traced from the series field RSF of the regulating generator RG, tuning resistor 11, contacts SS3 and SS1, control field GCF, front contacts 2TR1 of time contactor 2TR, now energized, contact SS8, and contact PS3 to the opposite side of the regulating generator RG.

The control field RCF of the regulating generator RG is connected as before directly across the rheostat sweep arms 17 and 19. Motor field MF as before is directly connected across the exciter busses 25 and 27. The shunt coil 35 of relay FR is energized by reason of its connection across the bridge circuit which as described is now energized. Contact members FR1 are therefore closed and the generator shunt field GF is connected across the generator terminals. The antihunting or differential field RDF of the regulating generator is connected across the main generator G through all of resistor 9 since timing relay 1TR is for normal operation energized and the contacts 1TR1 thereof open.

The function of the various relays in the control system will probably best be understood by describing the operation of the system for pilot room follow-up control. Assuming the motor generator system to be operating, a voltage is impressed by the exciter E across the busses 25 and 27. This immediately energizes the positioning motor field MF and the regulating generator differential field RDF. The steering room selector switch SS is now moved to the "Pilot room" position. This establishes part of a circuit to the bridge circuit from the bus 25, contact SS4, contact PS1 yet open, conductor 29 to one side of the bridge circuit, from the opposite side of the bridge circuit conductor 31, junction 33, contact SS6 to the conductor 27. Timing relay 2TR is energized from a circuit which may be traced from the bus 25, the coil of the relay 2TR back contacts 1CR1 of current relay 1CR, junction 37, contact SS13, contact PS8 (PS is still in "off" position), junction 33, contact SS6 to the bus 27. This circuit picks up relay 2TR closing contacts 2TR1 in the circuit of the generator control field GCF and closing the sealing contacts 2TR2 to establish its own holding circuit. Brake relay BR is energized by a circuit which begins with bus 25, the coil of the relay BR, junction 37, contacts SS13; contacts PS8, junction 33, contacts SS6 and thence to conductor 27. Brake relay BR now picks up closing its front contacts BR1 and establishing part of a circuit for the brake coil from bus 25, brake coil of brake BRK; contacts BR1, contact SS16, contacts 1TR2 yet open, contact PS2 normally closed in "follow-up" position of selector switch PS but yet open, junction 33, contact SS6 to conductor 27. The brake relay is also held in by a circuit across the exciter busses 25 and 27 including the contacts 2TR2.

The pilot room selector switch PS is now operated to its "follow-up" position. This opens contact PS8 but relays 2TR and BR remain across the exciter busses 25 and 27 through the holding circuit established therefor by the contacts 2TR2. Contacts PS1, PS2 and PS3 now close. Closure of contact PS3 completes the energizing circuit from the regulating generator for the generator control field GCF as previously described. Closure of contact PS2 completes another portion of the circuit for the coil of brake BRK. There yet remains open in this circuit contacts 1TR2. Closure of contact PS1 completes the circuit from bus 25, contact SS4, contact PS1 and conductor 29 to the bridge circuit as previously traced and applies exciter potential across the bridge.

Assuming now that the steering wheel is operated to displace the rheostat sweep arm 17 along rheostat 5 a potential difference between the sweep arms 17 and 19 appears which is of a polarity determined by the direction of the displacement of the sweep arm 17 with respect to that of the sweep arm 19. Current thus flows in the field RCF and the output of the generator RG through the established circuits energizes the field GCF. Thus a current flows in the motor armature circuit. As this current flow increases the voltage drop across the armature of the motor PM increases to a point where the voltage relay VR picks up. This closes contacts VR1 thereof and connects the coil of timing relay 1TR across the exciter busses 25 and 27. Relay 1TR now picks up opening its contacts 1TR1 and inserting the whole of resistor 9 in the circuit of field RDF thus reducing its effective ampere turns allowing the regulating generator voltage to more rapidly build up, closing contacts 1TR3 to establish a holding circuit for the coil thereof and closing contacts 1TR2 which completes the circuit to the coil of the brake relay BRK and releases the brake. Operation of the motor now begins in a direction to move the rudder to its correct position and at the same time to operate the sweep arm 19 towards a position to electrically balance the bridge. As the sweep arm approaches this position the motor voltage gradually drops with a consequent reduction in motor speed as shown in Fig. 4. When the voltage drops below a predetermined minimum the voltage relay VR drops out but relay 1TR is held up by its holding circuit including the contact 1TR3 and 12CR1. The voltage across the motor armature at which the relay VR drops out is higher than that at which it picks up. This is accomplished by the series resistor 39 which under normal starting conditions is shunted by the contacts 3TR1 of the timing relay 3TR. This timing relay is connected across the busses 25 and 27 as soon as contacts 1TR3 close and picks up instantly. Thus under normal conditions a loss of power occurs across this resistor and the total voltage required to hold the VR relay up is greater than that required to pick it up with the resistor shunted.

If the torque on the rudder, at any time during its movement or after it has substantially reached its limit of movement is sufficiently high to cause currents in the motor armature circuit above a predetermined maximum value, the current relay 12CR picks up and opens its contacts 12CR1 in the holding circuit for relays 1TR and 3TR causing these relays to drop out. Relay 1TR closes its contact 1TR1 to shunt a portion of the resistor 9 thereby increasing the differential effect of the field RDF and increasing the rate of decay of the regulating generator voltage and hence motor armature currents, opens its holding contacts 1TR3 and opens the brake circuit at its contacts 1TR2 causing the brake to set.

The limit switches RL1 and LL1 actuated by the arm 40 have been provided in opposite sides of the bridge circuit mainly to prevent overtravel of the rudder in the event one or the other of either of the rheostat extremities were open circuited in which case the motor would operate until the rudder had reached its mechanical limits of movement. For example, assuming an open circuit to exist at point 41 of the rheostat 7 it is apparent that a condition of electrical balance no longer exists even though as shown the sweep arms are at similar points on the rheostats. The electrical unbalance thus produced operates the motor in a direction to open the limit switch LL1 thus opening the other side of the rheostat 7 from the circuit and reducing the current flow in the field RCF to zero.

For non-follow-up control of the rudder as previously noted the control system may be operated from either the pilot room control switch PC or the steering room control switch SC depending upon the position of the steering room selector switch SS. Non-follow-up control would normally be used for example in the case where the control system were installed aboard a ship used for breaking ice. Under such conditions the rudder may be operating in water filled with ice blocks and be considerably impeded in its movements with the result that follow-up control no longer is practical.

Assuming that the rudder control is to be conducted from the pilot room, the steering room selector switch SS is placed in "pilot room" position and the pilot room selector switch in the "off" position. Relay 2TR is energized by a circuit which may be traced from the positive exciter bus 25, the coil of relay 2TR, contact 11CR1, junction 31, contact SS13, contact PS8, junction 33, contact SS6 and thence to the conductor 27. Brake relay BR is also energized through the circuit from bus 25 to junction 37 and thereafter through the circuit traced for timing relay 2TR. Both these relays pick-up and contacts 2TR2 establish their holding circuit. Closure of contact 2TR1 now does not connect the main generator control field GCF to the regulating generator as for follow-up control since the contact PS3 is now open and remains open in the non-follow-up position of switch PS. Contacts 2TR1 do however now establish a partial circuit for the generator field GCF across the exciter busses 25 and 27. Operation of the selector switch PS to its "non-follow-up" position closes the contacts PS6, PS4, PS5, PS9 and PS7 and opens contact PS8 now not needed since the holding circuits for relays 2TR and BR are made.

If now the pilot room control switch PC is moved to the "slow" position for right rudder the generator field is connected across the exciter busses by a circuit which may be traced from positive bus 25, contact SS4, junction 44, contact PC1, contact PS4, contact SS9, conductor 32, limit switch RL2, current coil 43 of the relay FR, contacts 2TR1, generator field GCF, contact PS6, contact PC3, resistor 45, contact PS7 and contact SS7 to the negative exciter bus 27. Since resistor 45 is connected in the circuit of the field GCF the generator output is low and the motor operates at slow speed to control the rudder. Simultaneously the coil of the brake B is energized by a circuit which is traced from the bus 25, the coil of brake BRK, contacts BR1, contacts SS16, contacts PC6, junction 46, contacts PS7, contacts SS7 to the opposite exciter bus 27 and the brake is released.

Operation of control switch PC to its "fast" position for right rudder movement shunts the resistor 45 at contacts PC5 and applies full exciter voltage to the generator field GCF. This also increases the current through the series current coil 43 of relay FR and causes this relay to pick-up and connect the self-excited field GF across the generator thus operating the generator at its maximum output and causing the rudder motor PM to operate at full speed.

Operation of the control switch PC for left rudder movement reverses the polarity of the generator field GCF to operate the motor in the left rudder direction. Otherwise the operation is the same. Contacts PC2, PC6 and PC4 making in the slow left rudder position and contact PC5 being additionally made in the fast position to shunt resistor 45.

For steering room control the pilot room selector switch PS is left in the "non-follow-up" position and the steering room selector switch SS moved to its "steering room" position. This closes contacts SS2, SS10, SS12, SS15 and SS18. In its "off" position the control switch SC through its contacts SC7 in a manner similar to contact PC7 establishes energizing circuits for the relays BR and 2TR. For right rudder movement contacts SC3, SC1, SC5 and SC6 are closed. This establishes a circuit for the generator control field from positive bus 25, through contacts SC1, SS10, conductor 32, limit switch RL2, coil 43 of relay FR, contacts 2TR1, field GCF, contacts SS2, and SC3 through resistor 47 to negative bus 27. In the "fast" position contact SC5 shunts the resistor 47 increasing the current in the field circuit and as before during pilot room non-follow-up control relay FR picks-up to insert the self-excited shunt field in the generator by means of contacts FR1, thus operating the motor at high speed. Contact SC6 in conjunction with contact SS18 energized the brake coil in both "slow" and "fast" positions to release the brake. In the "slow left rudder" position contacts SC4 and SC6 reverse the polarity of the generator control field, while symmetrically located contacts SC5 and SC6 respectively shunt resistor 47 and energize the coil of the brake BRK. Here again as in the pilot room non-follow-up control the limit switches LL2 and RL2 respectively for excessive left and right rudder movement open the field circuit of the main generator G. It is of course apparent that additional limit switches for left and right rudder movement may be provided which when opened progressively insert resistance in the generator field circuit to reduce the field currents prior to opening the circuit.

The descriptive disclosure hereinbefore made and the illustrations of the drawings are not to be considered in a limiting sense but are to be considered only as illustrative of a specific embodiment of the invention. The only limitations are to be determined from the scope of the appended claims.

We claim as our invention:

1. In a system of control for operating an element in accordance with movements of a control member, the combination of, a source of electrical energy, means electrically connected to the source of electrical energy and operated by the control member for producing an electrical quantity proportional to movements thereof, means operated by said element for reducing the electrical quantity to zero, a motor for operating the element, a first generator electrically connected to the motor, a second generator responsive to said electrical quantity for controlling the electrical output of the first generator, and means normally restraining said element from movement and responsive to a predetermined minimum electrical output of the second generator for releasing said element for movement.

2. In a system of control for operating an element in accordance with movements of a control member, the combination of, an electrical bridge circuit, a source of electrical energy connected to the bridge circuit, means operated by the control member for electrically unbalancing the bridge circuit, means operated upon movement of said element for electrically balancing the bridge circuit, a motor for driving said element, a first generator electrically connected to the motor, a second generator responsive to the electrical unbalance of the bridge circuit for controlling the electrical output of the first generator, and means normally restraining said element from movement and responsive to a predetermined minimum electrical output of the second generator for releasing said element for movement.

3. In a system of control for operating an element in accordance with movements of a control member, the combination of, means for producing an electrical quantity indicative of movement of the control member, means operated upon movement of said element for reducing the electrical quantity to zero, a motor for driving said element, a first generator electrically connected to the motor, a field winding for the first generator, a second generator having a series field winding electrically connected to the field winding of the first generator, a second field winding for the second generator electrically connected to said means for producing an electrical quantity and a third field winding for the second generator electrically connected to the first generator.

4. In a system of control for operating an element in accordance with movements of a control member, the combination of, means for producing an electrical quantity indicative of movements of the control member, means operated upon movement of said element for reducing the electrical quantity to zero, a motor for driving said element, generating means responsive to said electrical quantity having an electrical energy output of substantially maximum value for relatively small values of the electrical quantity, and circuit means for connecting the generating means to the motor.

5. In a system of control for operating an element in accordance with movements of a control member, the combination of, an electrical bridge circuit, a source of electrical energy for energizing the bridge circuit, means operated by the control member for unbalancing the bridge circuit, means operated upon movement of the element for balancing the bridge circuit, a motor for operating the element, a first generator including a differentially connected series field winding, a separately excited field winding and a self excited shunt field winding, said first generator being connected in series circuit relation with said motor, a second generator including a series field winding, a separately excited field winding and a differentially connected field winding, the separately excited field winding of the first generator being connected in series with the series field winding of the second generator, the differentially connected winding of the second generator being connected across the first generator and the separately excited field winding of the second generator being connected across the electrical bridge circuit to be energized by the electrical unbalance thereof.

6. In a system of control for operating an element in accordance with movements of a control member, the combination of, means for producing an electrical quantity indicative of movements of the control member, means operated upon movements of the element tending to reduce the electrical quantity to zero, a motor for operating said element, generating means electrically connected to the motor, a system of field windings for the generating means, said system of field windings being responsive to said electrical quantity and cooperating to cause the generating means to have a substantially maximum electrical energy output for relatively small values of the electrical quantity.

7. An electrical control system comprising, in combination, means for producing an electrical quantity, electromechanical means responsive to said electrical quantity and having a substantially maximum output of mechanical energy for relatively small values of the electrical quantity for reducing the electrical quantity to zero, and means operable when said electrical quantity reaches zero for mechanically locking the electromechanical means.

8. In a control system for positioning an element in accordance with a position of a control member, the combination of means for producing an electrical quantity indicative of a position of the control member, means operable upon movement of said element for reducing the electrical quantity to zero, a motor for operating the element, a main generator for supplying electrical energy to the motor, an auxiliary generator for supplying electrical energy to the main generator, means for making the auxiliary generator substantially self energizing, and a field winding for the auxiliary generator energized by said electrical quantity.

9. In a control system for positioning an element in accordance with a position of a control member, the combination of, means for producing an electrical quantity indicative of a position of the control member, means operated upon movement of said element for reducing the electrical quantity to zero, a motor for operating the element, a main generator for supplying electrical energy to the motor, a control generator for supplying electrical energy to the main generator, a field winding for the control generator energized by said electrical quantity, and means for operating said control generator at a high value of saturation.

10. In a system of control for positioning an element in accordance with the position of a control member, the combination of, an electrical bridge circuit, a source of electrical energy for energizing the bridge circuit, means responsive to movements of the control member for electrically unbalancing the bridge circuit in an amount indicative of the position of the control member, means operable in conjunction with said element for electrically balancing the bridge circuit, a motor for operating the element, a first generator for supplying electrical energy to the motor, a second generator for controlling the electrical energy output of the first generator, a field winding for the second generator electrically related to the bridge circuit, a series field winding for the second generator, and adjustable resistance means in series with the series field winding for regulating the electrical current in the series field circuit so that field ampere turns, as a function of the second generator voltage coincides with an initial straight portion of the second generator saturation curve.

WALTER SCHAELCHLIN.
ERLING FRISCH.

REFERENCES CITED

The following references are of record in the file of this patent:

UNITED STATES PATENTS

| Number | Name | Date |
| --- | --- | --- |
| 559,903 | Pfatischer | May 12, 1896 |
| 559,904 | Pfatischer | May 12, 1896 |